United States Patent [19]

Hulme

[11] 4,065,405

[45] Dec. 27, 1977

[54] RECOVERY OF TANTALUM AND/OR NIOBIUM PENTAFLUORIDES FROM A HYDROCARBON CONVERSION CATALYST

[75] Inventor: Roger Hulme, Somerville, N.J.

[73] Assignee: Exxon Research and Engineering Company, Linden, N.J.

[21] Appl. No.: 747,091

[22] Filed: Dec. 3, 1976

[51] Int. Cl.$^2$ .................. B01J 27/32; C07C 3/54; C07C 5/28; C10G 35/06
[52] U.S. Cl. .................. 252/415; 208/134; 260/666 R; 260/666 P; 260/671 R; 260/683.47; 260/683.68; 260/683.7; 260/683.74; 423/62; 423/64; 423/492
[58] Field of Search .................. 252/415, 411 R; 260/666 P, 671 R, 683.47, 683.68, 683.7, 683.74; 208/134; 423/62, 64, 492; 23/294

[56] References Cited

U.S. PATENT DOCUMENTS

| | | | |
|---|---|---|---|
| 2,928,722 | 3/1960 | Scheller et al. | 23/294 |
| 3,830,871 | 8/1974 | Mayer et al. | 260/683.68 |
| 3,948,761 | 4/1976 | Siskin et al. | 260/683.7 |

*Primary Examiner*—Winston A. Douglas
*Assistant Examiner*—P. E. Konopka
*Attorney, Agent, or Firm*—John W. Ditsler

[57] ABSTRACT

Tantalum and/or niobium pentafluorides may be recovered from a deactivated or partially deactivated hydrocarbon conversion catalyst comprising (a) a metal pentafluoride selected from the group consisting of tantalum pentafluoride, niobium pentafluoride and mixtures thereof and (b) hydrogen fluoride, by distilling said catalyst in the presence of a Lewis acid containing neither of these Group V metals, thereby displacing a pentahalide of tantalum and/or niobium into the vapor phase from which it can be condensed. Addition of hydrogen fluoride then converts the pentahalide to the pentafluoride.

14 Claims, No Drawings

RECOVERY OF TANTALUM AND/OR NIOBIUM PENTAFLUORIDES FROM A HYDROCARBON CONVERSION CATALYST

BACKGROUND OF THE INVENTION

1. Field of the Invention

The present invention relates to a process for recovering a component of a Friedel-Crafts type hydrocarbon conversion catalyst. More particularly, this invention relates to a process for recovering the metal pentafluoride component of a Friedel-Crafts type hydrocarbon conversion catalyst at least a portion of which has become deactivated by the formation of stable, catalytically inert complexes during contact with a hydrocarbon feedstock.

2. Description of the Prior Art

It is well known that the activity of a Friedel-Crafts type hydrocarbon conversion catalyst declines gradually due to the accumulation of various organic and inorganic contaminants or poisons (such as compounds of carbon, sulfur, nitrogen, oxygen, metals, water and the like) until the catalyst ceases to exhibit an economic activity. In such cases, depending upon various economic factors, the catalyst may be replaced or regenerated via recovering the active catalyst component in order to restore the desired activity levels to said catalyst.

Various methods have been suggested in the prior art for recovering the active component of Friedel-Crafts type hydrocarbon conversion catalysts, e.g. halogenation, hydrogenation. Nevertheless, it is believed that there is no suggestion for separating the active catalyst components from both organic and inorganic poisons according to the method described hereinafter.

SUMMARY OF THE INVENTION

Now according to the present invention, it has been discovered that the metal pentafluoride component of a deactivated or partially deactivated hydrocarbon conversion catalyst comprising (a) a metal pentafluoride selected from the group consisting of tantalum pentafluoride, niobium pentafluoride and mixtures thereof and (b) hydrogen fluoride, may be recovered by a process which comprises heating said catalyst with an added Lewis acid that does not contain tantalum or niobium and recovering the metal component of the catalyst as a pentahalide by removing said metal component as a vapor and recovering it by condensation followed by treatment of the condensate with anhydrous HF. The added Lewis acid serves to displace the metal pentafluoride component from its poisoned complexes. When the added Lewis acid is not itself a fluoride, then, in general, halogen exchange will occur and tantalum and/or niobium pentahalides will be recovered overhead. For efficient separation, the added Lewis acid or its halide exchange product with the catalyst should be less volatile than the tantalum and/or niobium pentahalide formed. In a preferred embodiment, hydrogen fluoride is removed from the deactivated catalyst prior to the above-described distillation, i.e. heating and condensation, of the catalyst with the Lewis acid. Uncomplexed metal pentafluoride may also be removed from the catalyst prior to said distillation.

Thus in the preferred embodiment of the present invention, at least a portion of the partially or wholly deactivated hydrocarbon conversion catalyst is stripped, resulting in a distillate containing hydrogen fluoride and minor amounts of the metal pentafluoride component, the exact amount depending upon the volatility of the metal pentafluoride and the temperature employed, and a residue from which uncomplexed tantalum and/or niobium pentafluorides may be recovered by extraction with an inert solvent, followed by the addition of a Lewis acid that does not contain tantalum or niobium, from which mixture, the metal in the form of a pentahalide, may be recovered by distillation. At least a portion of the metal pentahalide thus recovered may then be combined with hydrogen fluoride to form the metal pentafluoride component of the catalyst. If desired, additional HF can be added to reform the original hydrocarbon conversion catalyst.

DETAILED DESCRIPTION OF THE INVENTION

The hydrocarbon conversion catalyst referred to herein comprises (a) a metal pentafluoride selected from the group consisting of tantalum pentafluoride, niobium pentafluoride and mixtures thereof and (b) hydrogen fluoride.

In general, the deactivated or partially deactivated hydrocarbon conversion catalyst to be treated according to the present invention may be derived from those reactions and side reactions that occur under the influence of Friedel-Crafts catalysts, e.g., isomerization, alkylation, polymerization, cracking, hydrogenation, disproportionation, aromatic isomerization (e.g., ortho- to metaxylene) and the like (see for example U.S. Pat. Nos. 2,683,763; 2,683,764; 3,708,553; 3,728,411; 3,852,184; 3,888,937; 3,901,790; 3,948,761, the disclosures of which are incorporated herein by reference). Typically, the feedstocks used in such processes will contain hydrocarbons containing from 1 to about 15 carbon atoms, preferably from 1 to about 10 carbon atoms, and will have a 50 percent boiling point below 450° F, preferably below 400° F, measured at one atmosphere. However, the present process may also be employed to recover the metal pentafluoride component of catalysts obtained from hydrocarbon conversion processes wherein heavier, i.e., higher boiling, feedstocks are employed, e.g., feedstocks having a 50 percent boiling point above 450° F. Thus, the present process can be conveniently employed to recover the metal pentafluoride component from the catalysts obtained from a variety of hydrocarbon conversion processes and reactions.

The present invention is particularly applicable to recovering the metal pentafluoride component of catalysts obtained from isomerization and alkylation reactions. Typical isomerizable feedstocks include acyclic and alicyclic aliphatic hydrocarbons having at least four carbon atoms that are converted to a product enriched in an isomer thereof. Typically, acyclic hydrocarbons having at least four carbon atoms, that is straight chain or branched chain paraffins having from about 4 to 10 carbon atoms, preferably from about 4 to 8 carbon atoms, are converted to branched materials having higher octane ratings. Additionally, alicyclic hydrocarbons (naphthenes) having at least 6 carbon atoms, typically from 6 to about 20 carbon atoms, preferably 6 to 15 carbon atoms, can be converted to isomers thereof by contacting the same with hydrogen in the presence of the catalyst system described previously. Mixtures of acyclic and alicyclic hydrocarbons can be used as the process feedstock, including those containing less than 10 wt. % $C_6$–$C_8$ aromatics. In a typical commercial operation, a paraffin stream containing mixtures of various types of open chain and closed chain paraffins is used as the process feedstock. Typical isomerization reaction conditions are summarized below:

| Range | Suitable | Preferred |
|---|---|---|
| Temperature, °C | 0–150 | 30–75 |
| Hydrogen Partial Pressure, atm. | 0.1–140 | 0.3–25 |
| Reaction Time, min | 0.5–1500 | 1–500 |
| Moles H$_2$/Mole Hydrocarbon | 0.01–2.5 | 0.1–1.0 |
| Space Velocity V/Hr./V | 0.05–200 | 0.25–50 |

In the alkylation of hydrocarbons with olefins, suitable olefinic starting materials are ethylene, propylene, butylenes, trimethyl ethylene and other isomeric pentenes, and similar higher monoolefinic hydrocarbons of either a straight chain or branched chain structure. Olefins containing 2 to about 12 carbon atoms per molecule are preferred while olefins containing 2 to 5 carbon atoms per molecule are particularly preferred. The reaction mixtures may also contain some amounts of diolefins. Although it is desirable from an economic viewpoint to use the normally gaseous olefins as reactions, normally liquid olefins may also be used. Thus, polymers, copolymers, interpolymers, crosspolymers, etc., of the above-mentioned olefins, as, for example, propylene dimer, the diisobutylene and triisobutylene polymers, the codimer of normal and isobutylenes and the like may be used. The use of mixtures of two or more of the above-described olefins is also envisioned for this purpose.

Hydrocarbon feedstocks that are suitable for use in alkylation processes include paraffins, aromatics, alkyl substituted aromatic hydrocarbons and mixtures thereof. The paraffins as herein defined include the aliphatic and alicyclic hydrocarbons. The aliphatic hydrocarbons (straight and branched chain materials) contain at least 1, preferably 1 to about 12 carbon atoms per molecule, and may be exemplified by methane, ethane, propane, butanes, methylbutanes, n-pentane, methylpentanes, methylhexanes, and the like. The alicyclic hydrocarbons (naphthenes) contain at least 5, typically from 5 to about 15 carbon atoms per molecule, preferably 6 to 12 carbon atoms, and may be exemplified by methylcyclopentane, dimethylcyclopentane, methylcyclohexane, ethylcyclohexane, n-pentylcyclohexane and the like. Useful aromatic and alkylaromatic hydrocarbons contain at least 6, preferably 6 to about 20 carbon atoms per molecule, and are exemplified by benzene, ethylbenzene, n-butylbenzene and the like. Other aliphatic or alicyclic hydrocarbons commonly found in conventional petroleum hydrocarbon light naphtha streams and the like may be present. Typical alkylation reaction conditions are summarized below:

| Range | Suitable | Preferred |
|---|---|---|
| Temperature, °C | −100 – +150 | −10 – +80 |
| Hydrogen Partial Pressure, atm. | 0 – 100 | 0 – 25 |
| Reaction Time, Min. | 0.001 – 60+ | 0.001 – 45 |
| Space Velocity based on Olefin, V/Hr./V | 0.01 – 10 | 0.04 – 5 |

As the hydrocarbon conversion reaction proceeds, the activity of the catalyst system will decline. Some portions of said system may be deactivated so as to possess essentially no activity to catalyze the hydrocarbon conversion reaction while other portions may be only partially deactivated. While not wishing to be bound by any particular theory, it is believed that the present hydrocarbon conversion catalyst is deactivated or neutralized by contaminants which may be present in the hydrocarbon feedstock or which may be formed in situ during the hydrocarbon conversion reaction. The contaminants form complexes with the metal pentafluoride and/or hydrogen fluoride components of the catalyst system which are less catalytically active than the catalyst system itself. The complexes formed with the contaminants are substantially insoluble in the hydrocarbon phase and thus accumulate in the catalyst phase. As the complexes accumulate, the activity of the catalyst is diminished.

Both organic and inorganic contaminants can cause reduced activity of the present hydrocarbon conversion catalyst. Examples of inorganic materials that can cause the reduced activity are water, which may enter the reaction zone of the hydrocarbon conversion process in the feedstock or as the result of an operation mishap, and metal compounds which result from corrosion of the reaction zone internals or are present in heavier feedstocks. Examples of organic materials that can cause reduced activity are stable unsaturated ions, e.g. allylic and/or alkylaromatic carbocations formed in situ during the hydrocarbon conversion reaction. By allylic carbocations are meant materials of the general form:

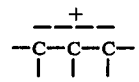

which are ultimately formed after a number of reactions, from hydrocarbons such as hexanes, cyclohexanes, heptanes, etc. By alkylaromatic carbocations are meant materials of the form:

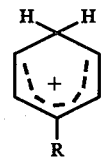

which are formed from alkylaromatics such as ethyl benzene, xylenes, toluene and the like, R being an alkyl or alkylaromatic compound. Other poisons likely to be found in hydrocarbon feedstocks include nitrogen-containing compounds, sulfur and oxygen-containing compounds and the like.

The level of activity at which recovery should be effected is largely a matter of economics. For example, it may be desirable to recover the metal pentafluoride of tantalum and/or niobium from a mildly deactivated catalyst rather than allow the catalyst to be reduced to a much lower level of activity before effecting recovery. As used herein, the term "recovery" or "recovered" means recovering metal halides of tantalum and/or niobium that possess a lower level of complexed poisons than that possessed by the metal pentafluoride component of the deactivated or partially deactivated catalyst. It should be understood that the recovery process of the present invention is applicable to catalysts such as those defined above which have lost some degree of activity and that the recovery may only partially restore the lost activity.

After allowing sufficient residence time for the hydrocarbon conversion reaction to progress, typically on the order from about 1 minute to about 1 hour or more, there is formed a mixture of hydrocarbon/deactivated or partially deactivated catalysts, often referred to as an "emulsion mixture". The emulsion mixture can be separated into a heavier catalyst phase, at least a portion of which is deactivated or partially deactivated, containing the metal pentafluoride and hydrogen fluoride, and a lighter hydrocarbon phase containing hydrocarbon product along with smaller amounts of metal fluoride and hydrogen fluoride which were dispersed and/or dissolved therein.

Although not necessary to the practice of the present invention, it is desirable, for economic reasons, to separate at least a portion, preferably a substantial portion, of the catalyst phase from the hydrocarbon phase prior to recovery of the metal pentafluoride. Most preferably, substantially all of the hydrocarbon phase, i.e. all but that portion dissolved or otherwise entrained in the catalyst, is separated from the catalyst phase prior to effecting recovery. The separation may be accomplished by any suitable means including settling, decanting, volatilization and the like.

According to the present invention, a Lewis acid that does not contain tantalum or niobium is added to the deactivated or partially deactivated catalyst phase and the resulting mixture is then distilled. The amount of Lewis acid added is not critical as it only affects the amount of metal pentafluoride displaced. Preferably, however, at least an equal molar amount of Lewis acid is added relative to the tantalum and/or niobium pentafluoride present in the catalyst. Suitable Lewis acids can be selected from the group consisting of the trihalides of aluminum and the tetrahalides of titanium, zirconium, hafnium and mixtures thereof. Preferred Lewis acids are selected from the group consisting of the trihalides of aluminum, the tetrahalides of titanium and mixtures thereof. Halides include fluorides, chlorides, bromides and iodides. Fluorides, chlorides and bromides are preferred halides. The most preferred Lewis acid is the fluoride, chloride or bromide of aluminum or their mixtures.

During said distillation, halide exchange reactions occur according to a reaction of the following form:

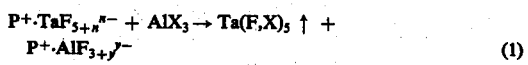

where P represents catalyst poisons, X is fluorine, chlorine or bromine and where $n$ or $y$ may be 1, 2 or 3. The metal component is removed overhead as a pentahalide and is significantly purified, i.e. the poison level is significantly less than in the spent catalyst. As shown in the above reaction, it is probable that derivatives of the tantalum and/or niobium pentafluorides will be produced by the halide exchange reactions. For example, derivatives of $TaF_5$ include $TaCl_5$ or $TaBr_5$ and/or mixed halides such as $TaBr_aCl_bF_c$ where $a + b + c = 5$. For an efficient separation, the added Lewis acid or its halide exchange product with the catalyst should be less volatile than the tantalum and/or niobium pentahalide formed. For example, the addition of $AlCl_3$ to the spent catalyst would result in the formation of $AlF_3$ (m.p. 1291° C) and $TaCl_5$ (b.p. 242° C).

The temperature at which the distillation is effected is not critical and is chosen to suit the volatility of the particular metal pentahalide to be recovered. In general, the temperature will range from about 70° to about 400° C., preferably from about 100° to about 400° C. Temperatures higher than needed to recover the metal pentahalides at an acceptable rate should be avoided to minimize contamination with other less volatile species. Also, pressure is not critical and can range broadly such that the distillation can be done in vacuo (e.g., 0.1 atmosphere) or at elevated pressure (e.g., say 30 atmospheres or more). The metal pentahalides thus recovered can then be converted to the corresponding metal pentafluorides by contact with hydrogen fluoride. The hydrogen fluoride should be added in an amount sufficient to convert at least a portion, preferably a major portion, of the metal pentahalide to the corresponding metal pentafluoride.

In a preferred embodiment of the present invention, the deactivated or partially deactivated hydrocarbon conversion catalyst is first stripped of substantially all the uncomplexed hydrogen fluoride and uncomplexed organic materials, e.g., hydrocarbon feed, that might be present. As used herein, the term "stripping" is meant to include removing hydrogen fluoride by distillation in vacuo or by stripping with hydrogen or an inert gas, e.g., nitrogen and the like. The hydrogen or inert gases may be pure or admixed with other components but should be substantially free of catalyst poisons such as $H_2O$, $H_2S$, $NH_3$ and organic sulfur, oxygen and nitrogen compounds. The conditions under which stripping is effected are not critical and may range broadly. Generally, however, the temperature will range from about $-20°$ to about $+100°$ C. Consumption of the stripping gas is minimized at low pressures since the mole fraction of the hydrogen fluoride removed overhead is greater under such conditions. Typically, the total pressure will range from about 0.1 to about 30 atmospheres or more. The HF stripped from the spent catalyst can be returned to the hydrocarbon conversion process if desired.

It is also preferred to extract the uncomplexed metal pentafluoride from said catalyst with an inert solvent prior to distillation. Suitable inert solvents are liquid hydrocarbons, preferably liquid alkanes, liquid cycloalkanes and mixtures thereof, including, for example, pentane, hexane, heptane, cyclohexane and the like. The extraction can occur at the same conditions employed for the stripping operation. If the feedstock to the hydrocarbon conversion process is employed as the solvent, the metal pentafluoride can be returned to the process with said feedstock. Otherwise, the metal pentafluoride can be recovered from the hydrocarbon solvent with HF according to the method disclosed in U.S. Pat. No. 3,830,871, the disclosures of which are incorporated herein by reference.

Both the stripping and extraction operations, as well as the separation of the hydrocarbon phase from the catalyst phase comprising the emulsion mixture, are preferred but not essential to the practice of the present invention as they serve to reduce unnecessary consumption of the added Lewis acid.

The recovery of the metal pentafluoride component of the deactivated or partially deactivated catalyst may be effected in any suitable apparatus. Contacting may be effected in batch, multiple batch, semi-continuous, or continuous operation. Preferably, the equipment will be such as to facilitate good mixing of the catalyst with the added Lewis acid. Equipment most suitable for specific application can be selected by one skilled in the art. However, at temperatures of at least 70° C alloy materials such as SS316, Teflon, carbon blocks and the like may be required.

The residue from said recovery contains the catalyst poisons complexed with the added Lewis acid and/or hydrogen fluoride and may be disposed of in any convenient manner.

The metal pentafluoride thus recovered may then be contacted with additional HF to reform the original hydrocarbon conversion catalyst. The amount of HF used will depend upon the requirement of the particular hydrocarbon conversion process. The amount of HF added will generally be such as to restore the original composition of the catalyst. In the case of the isomerization and alkylation processes described above, the amount of HF added will, in general, be such that at least an equal molar amount of HF relative to metal pentafluoride will be present in said hydrocarbon conversion process.

The following Example is presented to illustrate the process of the present invention and is not intended to unduly restrict the limits of the claims appended hereto.

EXAMPLE

A severely deactivated catalyst was prepared by heating HF (38 grams) and $TaF_5$ (55 grams) with a mixture of n-hexane and cyclohexane (90:10 vol. %) at 70° C for 12 hours. There was little or no $H_2$ partial pressure and no stirring. After this time, the pressure had risen to about 150 psig due to the formation of light gaseous cracked products. At this point, the catalyst was heated with a fresh charge of hydrocarbon feed and shown to be essentially devoid of catalytic activity towards isomerization and cracking.

All volatiles were removed by stripping with a stream of dry nitrogen at 100° C and the residue was found to be a black, tarry material. Analysis revealed this material to be a 6.5 wt. % carbon, 0.79 wt. % H, and 57.9 wt. % Ta.

2.72 grams of this material was placed in one arm of a two-armed vessel together with 3.34 gram of $AlBr_3$. The mixture was warmed to melt the $AlBr_3$ (about 92° C) while the other arm was cooled. A static vacuum was applied to the system. Yellow crystals distilled into the cooled arm and were then analyzed by combustion for carbon and by colorimetry for tantalum to give the following results:

| Element | Wt. % |
| --- | --- |
| C | 1.01 |
| H | <0.3 |
| Ta | 22.5 |
| Al | 5.24 |
| Br | 66.4 |

Thus, the weight ratio of Ta to carbon poisons increased from about 9:1 in the spent catalyst to about 22:1 in the distillate. Tantalum pentafluoride can then be easily obtained free of aluminum by treatment with anhydrous HF. This converts the halides in general to the corresponding fluorides of which only $AlF_3$ is insoluble. $AlF_3$ can be removed, e.g. by filtration, centrifuging, decantation, etc., thereby leaving tantalum pentafluoride in HF solution.

What is claimed is:

1. In a hydrocarbon conversion process which comprises contacting a hydrocarbon feedstock with a substantially liquid phase acid catalyst comprising (a) a metal pentafluoride selected from the group consisting of tantalum pentafluoride, niobium pentafluoride, and mixtures thereof and (b) hydrogen fluoride, thereby forming a hydrocarbon phase and a catalyst phase, said catalyst phase having become at least partially deactivated due to the formation of catalytically less active complexes with at least a portion of the metal pentafluoride, the improvement which comprises recovering at least a portion of the metal pentafluoride component of the catalyst according to the steps comprising 1. distilling said catalyst at a temperature ranging from about 70° to about 400° C. in the presence of a Lewis acid selected from the group consisting of the trihalides of aluminum, the tetrahalides of titanium, zirconium, hafnium and mixtures thereof to form the metal pentahalide of the catalyst component, and
    2. contacting the metal pentahalide thus formed with hydrogen fluoride in an amount sufficient to convert at least a portion of said metal pentahalide to the corresponding metal pentafluoride, thereby recovering the metal pentafluoride component of the catalyst possessing a lower level of said catalytically less active complexes than that possessed by the metal pentafluoride component of said deactivated catalyst.

2. The process of claim 1 wherein the catalyst phase is separated from the hydrocarbon phase and at least a portion of the hydrogen fluoride present in said catalyst phase is stripped therefrom prior to step (1).

3. The process of claim 1 wherein step (1) is effected at a temperature ranging from about 100° to about 400° C.

4. The process of claim 1 wherein the Lewis acid is selected from the group consisting of the trihalides of aluminum, the tetrahalides of titanium and mixtures thereof.

5. The process of claim 1 wherein said recovery is effected under substantially anhydrous conditions.

6. In a hydrocarbon conversion process which comprises contacting a hydrocarbon feedstock with a substantially liquid phase acid catalyst comprising (a) a metal pentafluoride selected from the group consisting of tantalum pentafluoride, niobium pentafluoride, and mixtures thereof and (b) hydrogen fluoride, thereby forming a hydrocarbon phase and a catalyst phase, said catalyst phase having become at least partially deactivated due to the formation of catalytically less active complexes with at least a portion of the metal pentafluoride, the improvement which comprises recovering at least a portion of the metal pentafluoride component of the catalyst according to the steps comprising:

1. stripping at least a portion of the hydrogen fluoride from said partially deactivated catalyst,
    2. extracting the uncomplexed metal pentafluoride from the residue of step (1) with a liquid hydrocarbon,
    3. distilling said catalyst at a temperature ranging from about 70° to about 400° C in the presence of a Lewis acid selected from the group consisting of the trihalides of aluminum, the tetrahalides of titanium, zirconium, hafnium and mixtures thereof to form the metal pentahalide of the catalyst component, and
    4. contacting the metal pentahalide formed in step (3) with hydrogen fluoride in an amount sufficient to convert at least a portion of said metal pentahalide to the corresponding metal pentafluoride, thereby recovering the metal pentafluoride component of the catalyst possessing a lower level of said catalytically less active complexes than that possessed by the metal pentafluoride component of said deactivated catalyst.

7. The process of claim 6 wherein the Lewis acid is selected from the group consisting of the trihalides of aluminum, the tetrahalides of titanium and mixtures thereof.

8. The process of claim 7 wherein the Lewis acid is the fluoride, chloride or bromide of aluminum.

9. The process of claim 6 wherein the stripping of step (1) is effected with a gas selected from the group consisting of hydrogen, inert gases and mixtures thereof.

10. The process of claim 6 wherein at least an equal molar amount of hydrogen fluoride is added in step (4).

11. In a hydrocarbon conversion process which comprises contacting a hydrocarbon feedstock with a substantially liquid phase acid catalyst comprising (a) a metal pentafluoride selected from the group consisting of tantalum pentafluoride, niobium pentafluoride, and mixtures thereof and (b) hydrogen fluoride, thereby forming a hydrocarbon phase and a catalyst phase, said catalyst phase having become at least partially deactivated due to the formation of catalytically less active complexes with at least a portion of the metal pentafluoride, the improvement which comprises recovering at least a portion of the metal pentafluoride component of the catalyst by distilling said catalyst at a temperature ranging from about 70° to about 400° C in the presence of a Lewis acid selected from the group consisting of aluminum fluoride, the tetrafluorides of titanium, zirconium, hafnium and mixtures thereof to form the metal pentafluoride component of the catalyst which possesses a lower level of said catalytically less active complexes than that possessed by the metal pentafluoride component of said deactivated catalyst.

12. The process of claim 11 wherein the catalyst is stripped with a gas selected from the group consisting of hydrogen, inert gases and mixtures thereof prior to said distillation.

13. The process of claim 11 wherein the Lewis acid is a fluoride of aluminum, hafnium or mixtures thereof.

14. The process of claim 11 wherein the Lewis acid is added in at least an equal molar amount relative to the metal pentafluoride present in the catalyst.

* * * * *